(12) United States Patent
Mohebbi et al.

(10) Patent No.: US 8,351,366 B2
(45) Date of Patent: Jan. 8, 2013

(54) CDMA UNII LINK

(75) Inventors: Behzad B. Mohebbi, San Diego, CA (US); Louis Botha, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 621 days.

(21) Appl. No.: 12/251,420

(22) Filed: Oct. 14, 2008

(65) Prior Publication Data

US 2009/0129442 A1    May 21, 2009

Related U.S. Application Data

(60) Provisional application No. 60/979,352, filed on Oct. 11, 2007.

(51) Int. Cl.
*H04B 7/14* (2006.01)
(52) U.S. Cl. .......................... 370/315; 455/17
(58) Field of Classification Search ............... 370/315; 455/7–25
See application file for complete search history.

(56) References Cited

U.S. PATENT DOCUMENTS

| | | | |
|---|---|---|---|
| 5,857,144 A * | 1/1999 | Mangum et al. | 455/11.1 |
| 6,697,642 B1 * | 2/2004 | Thomas | 455/562.1 |
| 2002/0021749 A1 * | 2/2002 | Lee et al. | 375/150 |
| 2002/0075830 A1 * | 6/2002 | Hartman, Jr. | 370/333 |
| 2002/0176485 A1 * | 11/2002 | Hudson | 375/144 |
| 2003/0048834 A1 * | 3/2003 | Feher | 375/219 |
| 2003/0124976 A1 * | 7/2003 | Tamaki et al. | 455/15 |
| 2003/0186718 A1 * | 10/2003 | Raaf et al. | 455/522 |
| 2003/0236067 A1 * | 12/2003 | Hasarchi et al. | 455/10 |
| 2004/0202138 A1 | 10/2004 | Song et al. | |
| 2004/0246936 A1 * | 12/2004 | Perlman | 370/343 |
| 2005/0059342 A1 * | 3/2005 | Engels et al. | 455/7 |
| 2008/0130723 A1 * | 6/2008 | Lee et al. | 375/211 |
| 2009/0042594 A1 * | 2/2009 | Yavuz et al. | 455/522 |

FOREIGN PATENT DOCUMENTS

WO    WO 2007037635    4/2007

* cited by examiner

*Primary Examiner* — Hassan Kizou
*Assistant Examiner* — Ashil Farahmand
(74) *Attorney, Agent, or Firm* — Mintz, Levin, Cohn, Ferris, Glovsky and Popeo P.C.

(57) ABSTRACT

Techniques and systems for mediating traffic between a network transceiver and a user transceiver in a wireless communication system are disclosed. A network link with the network transceiver is maintained using a network unit, and a user link with the user transceiver is maintained using a user unit. One or more replicas of a signal received from the network transceiver on a downlink path or from the user transceiver on an uplink path, respectively, are generated. The one or more replicas of the signal wirelessly are then transmitted on a hop between the network unit and the user unit along with a bi-directional control channel.

14 Claims, 7 Drawing Sheets

CDMA UNII LINK

CROSS REFERENCE TO RELATED APPLICATIONS

This application claims the benefit under 35 U.S.C. Section 119(e) of a provisional application U.S. Ser. No. 60/979,352, entitled "CDMA UNII LINK," filed Oct. 11, 2007, which is incorporated by reference herein.

BACKGROUND

This document relates to wireless communications, and more particularly to techniques and systems for implementing a wireless communications link that can provide additional multipath fading protection.

FIG. 1 shows an example of a 3-hop repeater for wireless communications. The 3-hop repeater has a middle hop (hop 2 in FIG. 1) which is "autonomous" from hop 1 that exists between a network unit 102 and Base Transceiver Station (BTS) (i.e. "network transceiver"), and hop 3 that exists between a user unit 104 and a Mobile Station (MS) (i.e. "user transceiver"). That is, the waveform envelope and bandwidth is different in the middle hop compared to the cellular waveform envelope and bandwidth that exist in hops 1 and 3.

The reason for this change of waveform is to modulate the original signal such that the fading in the middle hop (hop 2) can be mitigated by the use of broadband modulation such as Orthogonal Frequency Division Modulation (OFDM), so that the repeated signal is only subject to two fading hops (hops 1 and 3). A third additional hop that imposes yet another fading pattern on the original signal, be it Rayleigh or Rician, can degrade the end signal considerably and push the required fading margins on all three hops sufficiently high to render the repeater ineffective.

OFDM has been the preferred modulation choice for operating in UNII band for systems such as 802.11a and 802.11n and WiMax, as OFDM is very resilient in multipath channels and benefits from inherent frequency diversity. As the operational requirements in the UNII band are only limited to transmit power and spectral emission mask emission, "wideband digital modulation" and a minimum of 1 Mbits/s data rate, there are no regulatory or any other requirements that prohibit the use of other broadband digital modulation schemes such as Spread Spectrum.

SUMMARY

This document defines a wireless communications link that can provide additional multipath fading protection by providing extra frequency and path diversity, for devices that require one or several additional links (usually wireless), in their end-to-end communications pathway. The systems and methods disclosed here are based on a link using multi-carrier Spread Spectrum modulation for a middle link in a three-hop repeater, to combat the multipath frequency selective fading of an indoor channel.

In one aspect, a repeater that mediates traffic between a network transceiver and a user transceiver in a wireless communication system is presented. The repeater includes a network unit that maintains a network link with the network transceiver, and a user unit that maintains a user link with the user transceiver. The repeater further includes a two-way communication pathway between the network unit and the user unit. The two-way communication pathway includes a processor connected with each of the network unit and the user unit for generating one or more replicas of a signal received from the network transceiver on a downlink path or from the user transceiver on an uplink path respectively, and for transmitting the one or more replicas of the signal wirelessly on a hop between the network unit and the user unit along with one or more bi-directional control channels.

In another aspect, a method of mediating traffic between a network transceiver and a user transceiver in a wireless communication system is disclosed. The method includes maintaining a network link with the network transceiver using a network unit, maintaining a user link with the user transceiver using a user unit, and generating one or more replicas of a signal received from the network transceiver on a downlink path or from the user transceiver on an uplink path, respectively. The method further includes transmitting the one or more replicas of the signal wirelessly on a hop between the network unit and the user unit along with a bi-directional control channel.

In one alternative aspect, a method includes generating one or more spread spectrum channels on a hop between the network unit and the user unit, and wirelessly transmitting the signal received from the network transceiver on a downlink path or from the user transceiver on an uplink path, respectively, on the one or more spread spectrum channels along with one more bidirectional control channels.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes wireless communications techniques and links that provide additional multipath fading protection by providing extra frequency and path diversity. The systems and methods disclosed here are based on a link using multi-carrier Spread Spectrum modulation for a middle link in a three-hop repeater, to combat the multipath frequency selective fading of an indoor channel. An example of a device using such a link is the three-hop cellular booster (referred to hereafter as "3-hop repeater") discussed in patent applications WO2005025078 by Mohebbi, filed Sep. 3, 2003 and WO2005069249 by Mohebbi filed Jan. 12, 2004. The link is not limited to any, specific 3-hop repeater, and can be used between any two (or more) devices operating in the licensed or unlicensed bands (e.g. UNII band).

Figure 1:
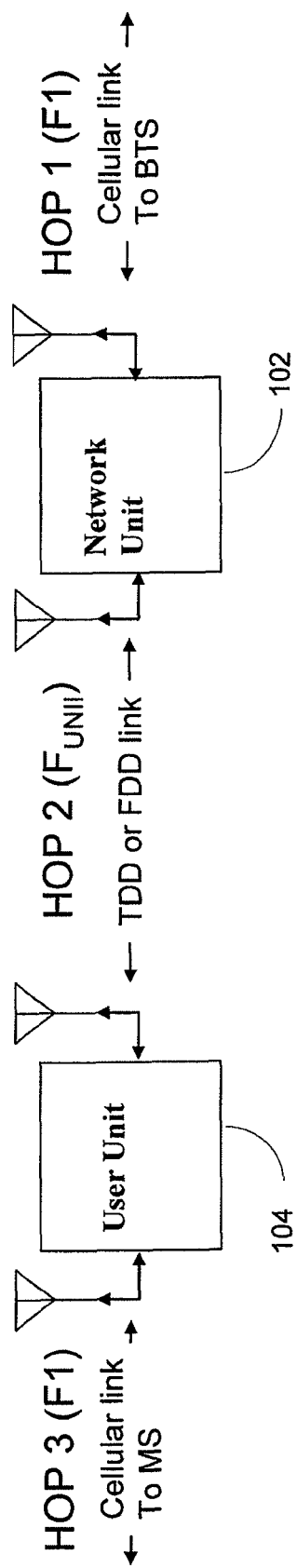
FIG. 1 shows a three-hop cellular repeater.
Figure 2:
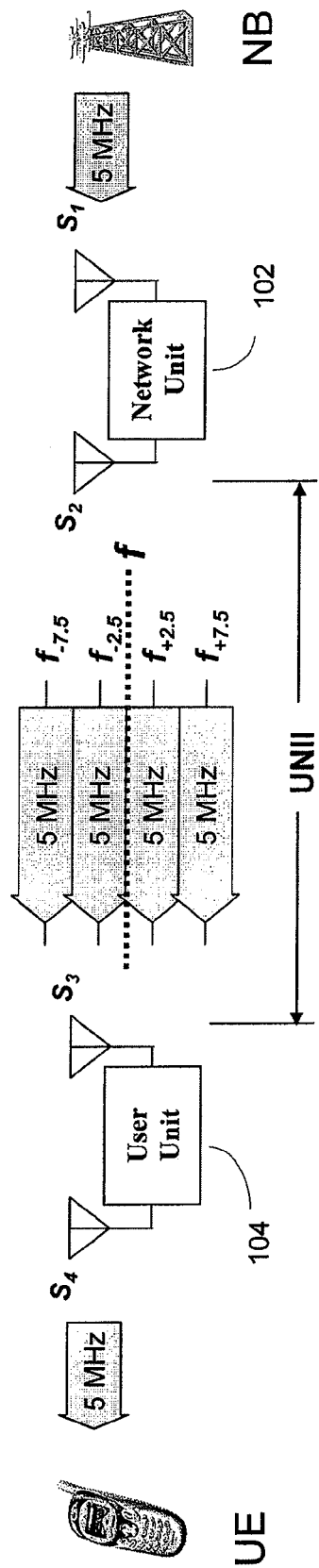
FIG. 2 illustrates a communications channel in the UNII band.

As illustrated in FIG. 2, the downlink received signal ($S_1$) is the waveform in a 5 MHz Wideband Code Division Multiple Access (WCDMA) operating frequency. The waveform is a CDMA signal transmitted from the NB to mobiles with a chipping rate of 3.84 Mchips/s passed through a SRRC pulse shaping filter with a roll-off of 0.22, fitting into a 5 MHz spectrum, defining a single signaling channel in WCDMA system. The signal in the 5 MHz channel ($S_1$) is then received by the Network unit, converted to baseband and digitized (in a digital implementation of Network unit) for further signal processing. The sampling frequency of the ADC/DAC is assumed to be sufficiently high for the signal processing operation (e.g. 80 Msamples/s).

Figure 3:
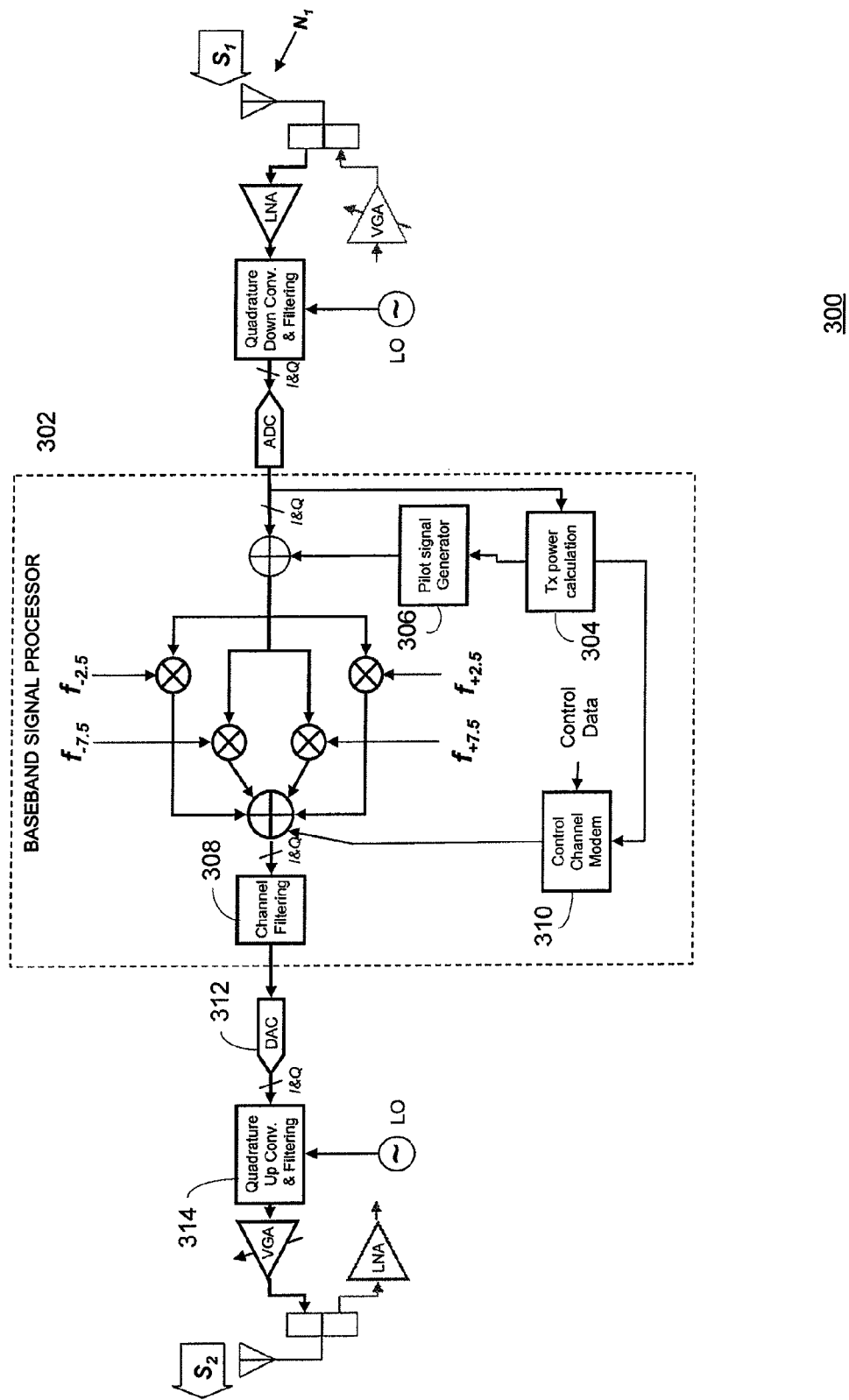
FIG. 3 illustrates baseband datapath processing in a Network Unit (DL).

FIG. 3 shows an example of a baseband signal processor 302 and operations in the network unit 300 for the downlink arrangement shown in FIG. 2. With reference to FIG. 3, at baseband, cellular signal received signal strength indication (RSSI) is estimated at TX power calculation block 304. The RSSI information is then used in pilot signal generator block 306, where a pilot signal is generated at 3.84 Mchips/s, filtered with a square-root raised-cosine (SRRC) pulse shaping filter with a role-off factor of 0.22, and amplitude-adjusted such that its insertion under the cellular signal (around 15 dB lower, for example) does not cause any noticeable interference to the cellular signal. After the insertion of the pilot, the combined signal is then replicated and modulated by several different complex carriers, with 5 MHz spacing.

The replicated signals, now centered at different carrier frequencies are then added together and further summed with the signal from the control channel and filtered by channel filtering block 308 before Digital-to-Analogue conversion (DAC) by DAC block 312, and up-conversion to a UNII channel and filtering by quadrature up converter and filter block 314, for subsequent transmission to the User unit ($S_2$). The channel filtering filter block 308 shown in FIG. 3 ensures that the transmitted signal conforms to the spectral mask emission requirements of UNII band, and depending on the final spectrum shape of the signal, it may or may not be required. If used, care has to be taken not to distort the cellular signal excessively, which could lead to appreciable loss of Processing Gain (PG). The complex carrier frequencies $f_{-2.5}$, $f_{-7.5}$, $f_{+2.5}$ and $f_{+7.5}$ are 2.5, 7.5 MHz below and above the defined centre frequency (f) of a given UNII channel respectively. The communications channel between the Network and User units at UNII band is adapted to also support the control channel that exists between the two devices with a data rate of approximately 1 Mbits/s, although other data rates may suitably be used.

There are several options for supporting the control channel at the physical layer. These options include spreading control data to the full bandwidth of the UNII band signaling channel (20 MHz in FIGS. 2 and 3). The control data can be pulsed shaped to fit to the channel, and inserted with a power below the cellular signal power, such that it does not interfere with the cellular signal (e.g. 20 dB below). This is the option shown in FIG. 3. The block TX power Calculation block 304 estimates the power of the received cellular signal ($S_1$), which is then used in a control channel modem block 310 to adjust the insertion power of the control channel, such that it does not degrade the cellular signal quality.

Another option for supporting the control channel at the physical layer includes allocating a portion (for example, 5 MHz or less) of the UNII channel to the control channel. With this option, the example in FIG. 2 will have three replicas of the cellular signal, along with a 5 MHz signaling allocated to the control channel, and the power of the control channel can be set to a desired value. Other techniques such as regular "blank-and-burst" or "dim-and-burst" transmissions techniques can also be used to send the control information. Selection of blanking repetition rate and the burst duration are executed such that the degradation of the cellular signal is kept to a minimum (e.g. 10 μsec OFDM burst every 1 msec).

Figure 4:
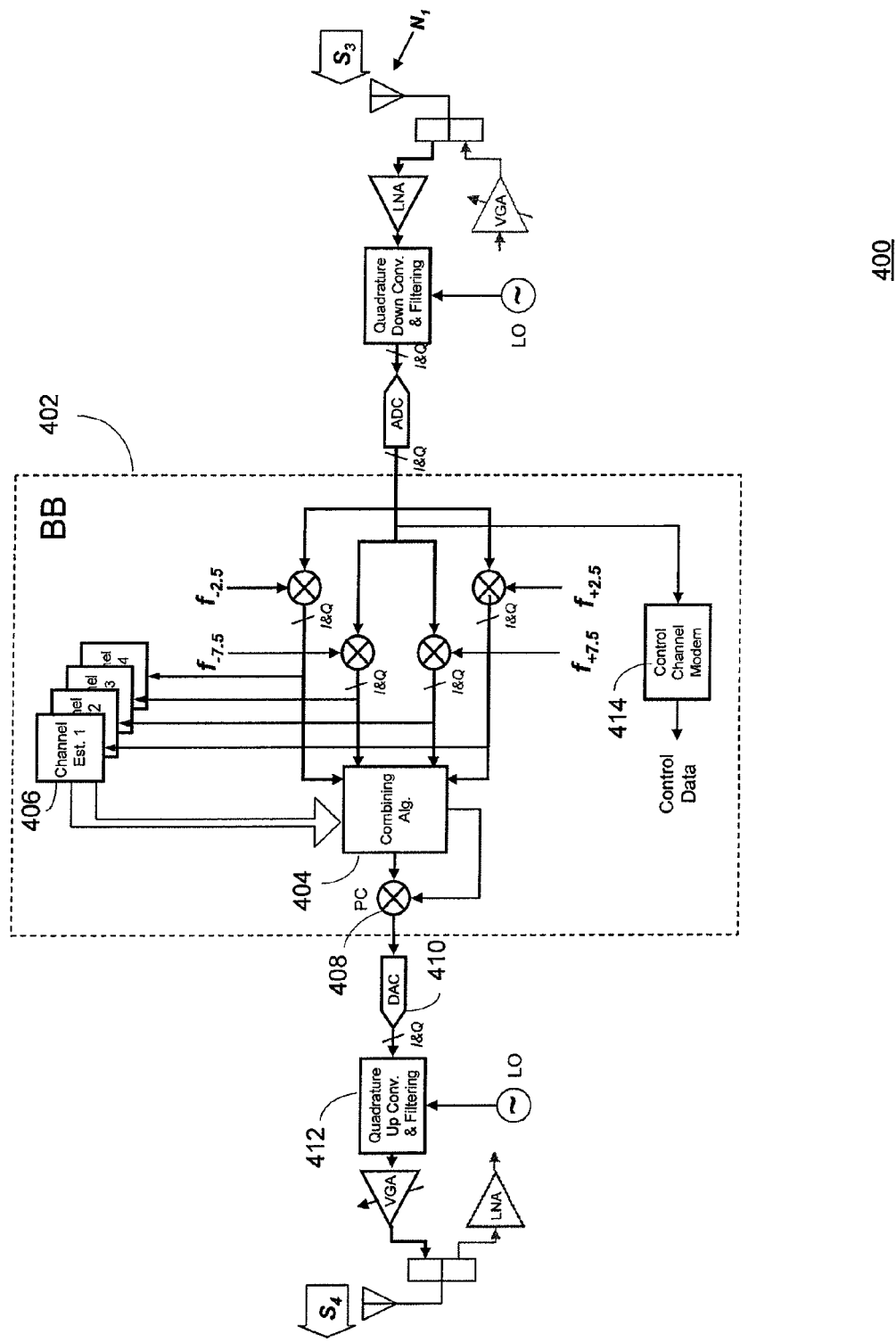
FIG. 4 illustrates baseband datapath processing in a User Unit (DL).

FIG. 4 shows a downlink baseband processor 402 for the User unit 400 and downlink datapath which is used to receive signals ($S_3$) transmitted by the Network Unit shown in FIG. 3 ($S_2$). In the User unit 400, the carrier frequency offset is removed from each of the replicated carriers in baseband, before a combiner block 404 performs combining (Selection or maximal ratio combining (MRC)) on the received 5 MHz signaling channels. While Selection combining can be based on the received signal RSSI of each channel, MRC requires channel estimation for each 5 MHz signaling channel by a channel estimator 406. For channel estimation, either CPICH can be used (if downlink) or the dedicated inserted pilot underlays (as discussed above) can be used. In some implementations, each individual channel is associated with and uses its own channel estimator 406.

Alternatively, a technique described in U.S. Provisional Patent Application No. 60/932,677 filed on Jun. 4, 2007 entitled, "Short Range Booster With Multiple Antennas" (the content of which is incorporated by reference herein for all purposes) can be used for the estimation of the relative phase and amplitude. This information is then used in the combiner block 404. The combiner block 404, after combining, calculates the combined signal phase offset based on the channel estimates, and corrects the combined signal's overall phase to its original value by a phase corrector 408, using a Phase Correction "PC" multiplier. After phase correction, the signal is returned to analogue domain by DAC 410, and is up converted and filtered by quadrature up converter and filter 412 for transmission on the original downlink frequency band of the cellular network ($S_4$). At this point, $S_1$ and $S_4$ are substantially at the same carrier frequency. A Control Channel Modem block 414 is the receiver unit for the control channel signal and is similar to a RAKE finger, with despreader, AFC, DLL and other modem functions for receiving, demodulating and detecting the information bits on the control channel.

Figure 5:
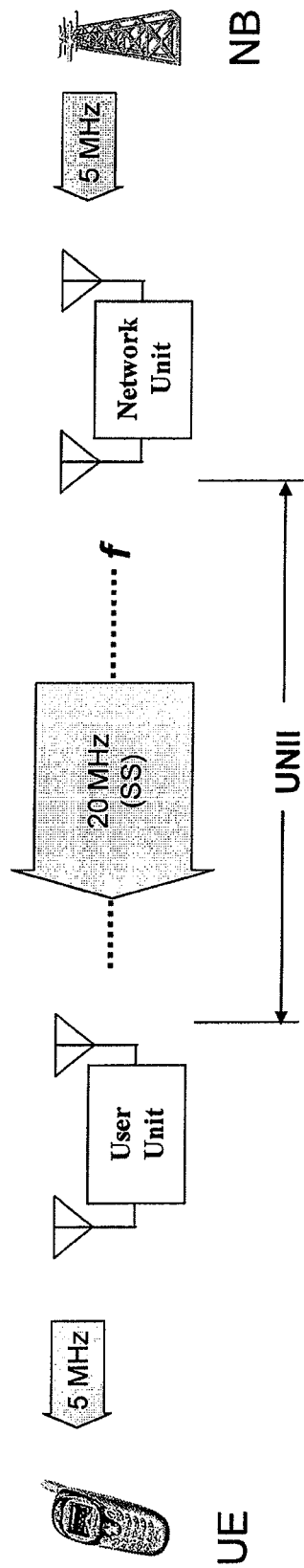
FIG. 5 illustrates a communications channel in the UNII band in accordance with another aspect.

While in the above modulation technique, the downlink received signal ($S_1$ in FIG. 2) is replicated and transmitted by the Network unit in UNII channel ($S_2$ in FIG. 2), it is alternatively possible to spread the received signal ($S_1$ in FIG. 5) to the entire signaling bandwidth of the UNII channel ($S_2$ in FIG. 5), which is 20 MHz in the example, as shown in FIG. 5. While the modulation scheme shown in FIG. 2 will provide frequency diversity, it may not provide the path diversity possible by higher chipping rate provided by the scheme shown in FIG. 5.

In FIG. 5, the downlink received signal is the waveform in a 5 MHz WCDMA operating frequency. The waveform is a CDMA signal transmitted from the NB to mobiles with a chipping rate of 3.84 Mchips/s passed through a SRRC pulse shaping filter with a roll-off factor of 0.22, fitting into a 5 MHz spectrum, defining a single signaling channel in WCDMA system. The signal in the 5 MHz channel ($S_1$) is then received by the Network unit, converted to baseband and digitized (in a digital implementation of Network unit) for further signal processing. The sampling frequency of the ADC/DAC is assumed to be sufficiently high for the signal processing operation (e.g. 80 Msamples/s).

Figure 6:
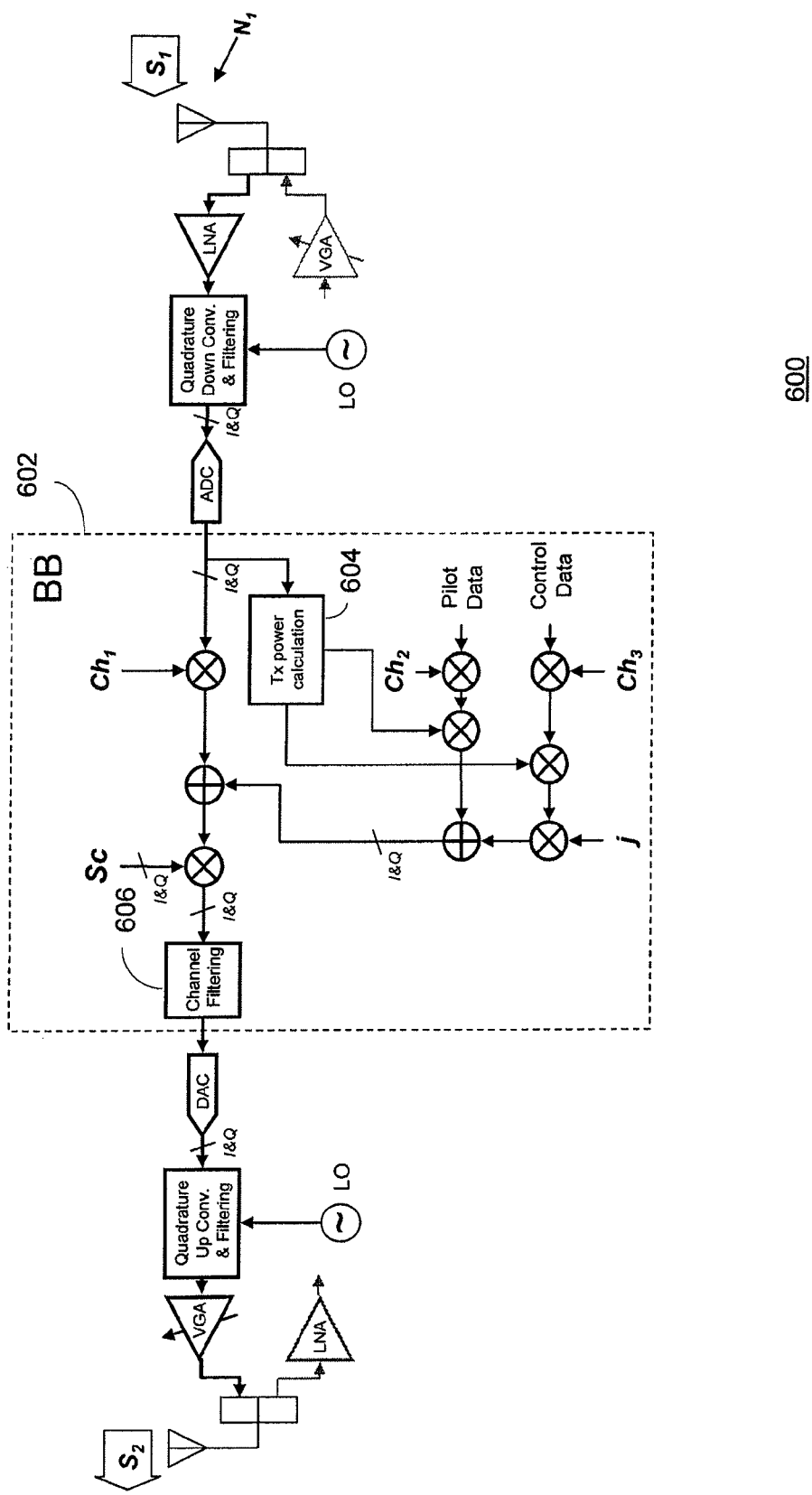
FIG. 6 illustrates other baseband datapath processing in a Network Unit (DL).

FIG. 6 shows an example of downlink baseband signal processor 602 and operations in the Network unit 600 for the arrangement shown in FIG. 5. With reference to FIG. 6, at baseband, the received cellular signal is spread further by a channelization code ($Ch_1$) with a chipping rate of 11 MChips/s (the 11 MChips/s chipping rate is an example and can be different or optimized further). The pilot channel data is spread by a channelization code ($Ch_2$) with the same chipping rate of 11 MChips/s. Control channel data is spread by a channelization code ($Ch_3$) which also has a chipping rate of say 11 MChips/s. All three channelization codes $Ch_1$, $Ch_2$ and $Ch_3$ are orthogonal to each other.

The pilot and control channels are weighted for a set magnitude before they are quadrature modulated and added to the channelized data path. The magnitudes of the pilot and the control channels are calculated by TX power calculator block 605 and adjusted such that they have negligible interference on the cellular signal. The summed signal is then spread by the complex scrambling code (Sc) with the same chipping rate as the channelization codes (11 MChips/s in this example) and is filtered by an SRRC pulse shaping filter with a roll-off factor of 0.22 by channel filtering block 606. This gives a resulting signal with a −3 dB bandwidth of around 18 MHz, which should fit into the 20 MHz channel bandwidth of the UNII band. It must be ensured that the transit Spectral Mask requirement of UNII band is met by the "channel filtering" filter. If the UNII band spectral mask emission requirement is not met by a RRC cosine with roll-off factor of 0.22, the pulse shaping filter or/and the spreading and scrambling chipping rate has to be modified to meet the requirements and in doing so, care has to be taken not to distort the cellular signal excessively, which could lead to appreciable loss of Processing Gain (PG).

Other options for supporting the control channel, i.e. of 1 Mbits/s, at the physical layer include spreading control data to the full bandwidth of the UNII band signaling channel (20 MHz in FIGS. 2 and 3), pulsed shaped to fit to the channel, and is inserted with a power below the cellular signal power, such that it does not interfere with the cellular signal (e.g. 20 dB below).

The options also include allocating a portion (5 MHz or less) of the UNII channel to the control channel, using any desired modulation. For example, with this option, the example in FIG. 5 will have about 13 MHz of bandwidth for cellular signal, along with a 5 MHz signaling allocated to the control channel. With this option, the power of control channel can be set to a desired value. Other techniques, such as regular "blank-and-burst" or "Dim-and-burst"transmissions, can also be used to send the control information. Selection of blanking repetition rate and the burst duration must be executed such that the degradation of the cellular signal is kept to a minimum (e.g. 10 μsec OFDM burst every 1 msec).

Figure 7:
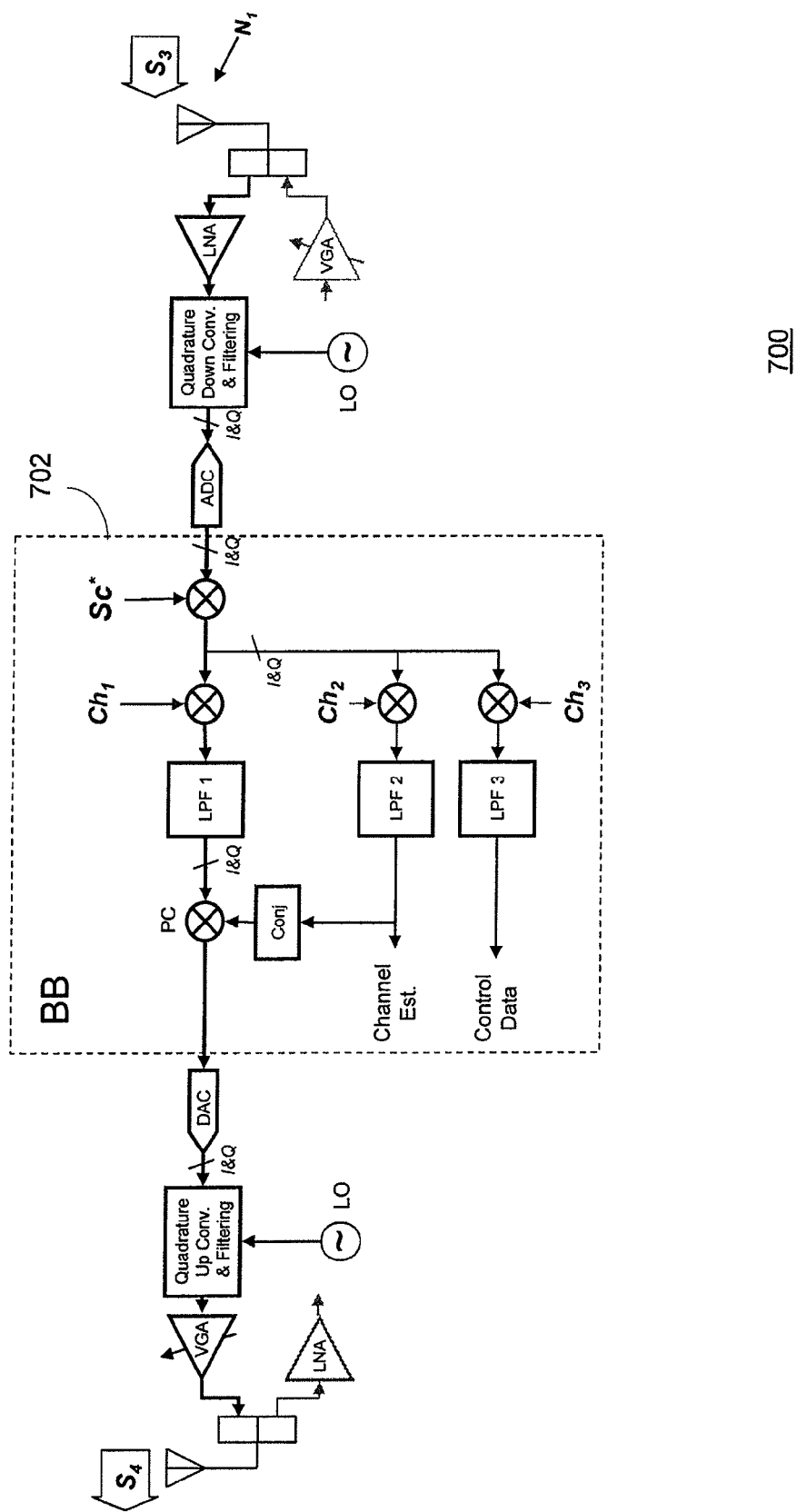
FIG. 7 illustrates other baseband datapath processing in a User Unit (DL).

FIG. 7 shows a downlink baseband datapath processor 702 of the User unit 700 which is used to receive signals ($S_3$) transmitted by the Network Unit shown in FIG. 6 ($S_2$). An optional SRRC filter with roll-off factor 0.22 can be used as the first block in the baseband datapath processing (not shown in FIG. 7). In the User unit baseband processing, spread spectrum modulation is removed by despreading the scrambling and channelization codes and low-pass filtering each data, pilot and control channels to the original signal bandwidth. In FIG. 7, the data path low-pass filter (LPF1) has a similar (or slightly higher) bandwidth to original cellular signal BW before the spreading in the Network unit. Low-pass filter for the pilot channel (LPF2) can have any bandwidth between the transmitted signal BW (18 MHz in this example) down to 1 Hz. The smaller the BW, the higher will be the processing gain of the Pilot channel and the longer the response time of this channel. A preferred choice for the LPF2 bandwidth is the bandwidth of LPF1. The low-pass filter for the Control channel (LPF3) is set to the control channel data rate or, alternatively, an integrator-and-dump, sampling at the control channel symbol rate can be used.

After the despreading and filtering of the datapath, the signal is phase corrected by the channel estimate at multiplier (CP) and is returned to analogue domain by the DAC, up converted and filtered for transmission on the original downlink frequency band of the cellular network ($S_4$). At this point, $S_1$ and $S_4$ are substantially at the same carrier frequency.

FIG. 7 operations are similar to a RAKE finger for all three datapath, pilot and control channels, with despreader, AFC, DLL and other modem functions for receiving, demodulating and detecting the information bits on the control channel. As such it is possible to use a number of Rake fingers to optimally utilize the path diversity gain of time dispersive channels. It is also possible for both receiver structures shown in FIGS. 4 and 7, to use the well know Equalization algorithms such as MMSE to reduce the ISI (or ICI) introduced in the UNII channel. It is also possible to use antenna diversity combining such as MRC, before or after the despreading operation. If used before, the technique described in U.S. Provisional Patent Application No. 60/932,677 filed on Jun. 4, 2007 entitled, "Short Range Booster With Multiple Antennas" can be used for the estimation of the relative phase and amplitude. If used after, either CPICH can be used (if downlink) or dedicated inserted pilot underlays (as discussed above) can be used for the combining purposes.

Although a few embodiments have been described in detail above, other modifications are possible. Other embodiments may be within the scope of the following claims.

What is claimed:

1. A repeater that mediates traffic between a network transceiver and a user transceiver in a wireless communication system, the repeater comprising:
    a network unit that maintains a network link with the network transceiver;
    a user unit that maintains a user link with the user transceiver; and
    a two-way communication pathway between the network unit and the user unit,
    the two-way communication pathway comprising a processor connected with each of the network unit and the user unit for generating a plurality of replicas of a signal received from the network transceiver on a downlink path or from the user transceiver on an uplink path respectively, and for transmitting the plurality of replicas of the signal wirelessly on a hop between the network unit and the user unit along with one or more bi-directional control channels,
    each replica of the plurality of replicas being transmitted on a different frequency,
    wherein the plurality of replicas of the signal each comprise a combination of a pilot signal with an original signal either received at the network unit from the network transceiver on the downlink path or received at the user unit from the user transceiver on the uplink path,
    wherein an amplitude of the pilot signal is based on an estimated signal strength indication for the original signal.

2. The repeater of claim 1, wherein the plurality of replicas of the signal are spaced apart by at least one signaling bandwidth of the original signal.

3. The repeater of claim 1, wherein the processor is further adapted to perform at least one of combination and selection of at least one of the plurality of replicas of the signal.

4. The repeater of claim 3, wherein the processor is further adapted to filter a combination of the selected plurality of replicas of the signal and a control channel signal, the filtered signal being converted to an analog signal.

5. The repeater of claim 4, wherein the processor is adapted to conform the plurality of replicas of the signal to spectral mask emission requirements of the UNII band.

6. A method of mediating traffic between a network transceiver and a user transceiver in a wireless communication system, the method comprising:
    maintaining a network link with the network transceiver using a network unit;
    maintaining a user link with the user transceiver using a user unit;
    generating a plurality of replicas of a signal received from the network transceiver on a downlink path or from the user transceiver on an uplink path, respectively; and
    transmitting the plurality of replicas of the signal wirelessly on a hop between the network unit and the user unit along with a bi-directional control channel,
    wherein each replica is transmitted at a different frequency;
    wherein the plurality of replicas of the signal each comprise a combination of a pilot signal with an original signal either received at the network unit from the network transceiver on the downlink path or at the user unit from the user transceiver on the uplink path,
    wherein an amplitude of the pilot signal is based on an estimated signal strength indication for the original signal.

7. The method in accordance with claim 6, further comprising combining the plurality of replicas of the signal for transmission on the UNII channel.

8. The method in accordance with claim 6, further comprising modulating the plurality of replicas of the signal with a number of different carrier signals.

9. The method in accordance with claim 6, wherein the plurality of of the signal are spaced apart at least one signaling bandwidth of the original received signal.

10. The method in accordance with claim 6, further comprising combining the plurality of replicas of the signal.

11. The method in accordance with claim 10, further comprising converting the combined plurality of replicas of the signal to an analog signal.

12. A method of mediating traffic between a network transceiver and a user transceiver in a wireless communication system, the method comprising:
    maintaining a network link with the network transceiver using a network unit; maintaining a user link with the user transceiver using a user unit;
    generating one or more spread spectrum channels on a hop between the network unit and the user unit; and
    wirelessly transmitting a signal received from the network transceiver and at the network unit on a downlink path or from the user transceiver and at the user unit on an uplink path, respectively, on the one or more spread spectrum channels along with one more bi-directional control channels;
    generating a plurality of replicas of the signal received from the network transceiver on a downlink path or from the user transceiver on an uplink path, respectively,
    the replicas of the signal being a combination of a spread spectrum pilot signal and an original signal received either at the network unit from the network transceiver on the downlink path or at the user unit from the user transceiver on the uplink path; and
    transmitting the plurality of replicas of the signal at different frequencies,
    wherein an amplitude of the generated spread spectrum pilot signal is based on an estimated signal strength indication for the original signal.

13. The method in accordance with claim 12, further comprising modulating the plurality of replicas of the signal with a number of different carrier signals.

14. The method in accordance with claim 12, wherein the plurality of replicas of the signal are spaced apart by at least one signaling bandwidth of the original signal.

* * * * *